US009681066B2

United States Patent
Strandemar

(10) Patent No.: US 9,681,066 B2
(45) Date of Patent: Jun. 13, 2017

(54) FACILITATING IMPROVED CALIBRATION OF CAPTURED INFRARED DATA VALUES BY AN IR IMAGING SYSTEM IN A THERMOGRAPHY ARRANGEMENT

(71) Applicant: FLIR SYSTEMS AB, Taby (SE)

(72) Inventor: Katrin Strandemar, Rimbo (SE)

(73) Assignee: FLIR SYSTEMS AB, Taby (SE)

( * ) Notice: Subject to any disclaimer, the term of this patent is extended or adjusted under 35 U.S.C. 154(b) by 274 days.

(21) Appl. No.: 14/325,298

(22) Filed: Jul. 7, 2014

(65) Prior Publication Data

US 2015/0009335 A1 Jan. 8, 2015

Related U.S. Application Data

(60) Provisional application No. 61/843,863, filed on Jul. 8, 2013.

(51) Int. Cl.
| | | |
|---|---|---|
| *H04N 5/33* | (2006.01) | |
| *H04N 17/00* | (2006.01) | |
| *H04N 5/365* | (2011.01) | |
| *G01J 5/00* | (2006.01) | |

(52) U.S. Cl.
CPC ............. *H04N 5/33* (2013.01); *G01J 5/0025* (2013.01); *H04N 17/002* (2013.01); *G01J 2005/0048* (2013.01); *G01J 2005/0077* (2013.01); *H04N 5/332* (2013.01); *H04N 5/3651* (2013.01)

(58) Field of Classification Search
CPC ................................ H04N 5/33; G01J 5/0025
See application file for complete search history.

(56) References Cited

U.S. PATENT DOCUMENTS

| | | | | |
|---|---|---|---|---|
| 5,488,674 A | * | 1/1996 | Burt ........................... | G06T 5/50 345/639 |
| 6,517,238 B2 | * | 2/2003 | Sun ........................ | G01N 25/72 250/341.6 |
| 7,620,265 B1 | * | 11/2009 | Wolff ........................ | G06T 5/50 382/254 |
| 7,667,198 B2 | * | 2/2010 | Strandemar .............. | H04N 5/33 250/330 |
| 7,732,768 B1 | * | 6/2010 | Haigh ....................... | G01J 5/02 250/330 |
| 7,996,066 B2 | * | 8/2011 | Schlagheck .......... | A61B 5/0073 250/316.1 |
| 8,244,488 B2 | * | 8/2012 | Allen ..................... | G01N 25/00 374/121 |
| 2005/0008215 A1 | * | 1/2005 | Shepard ................. | G01N 25/72 382/141 |
| 2007/0247517 A1 | * | 10/2007 | Zhang .................. | G06K 9/2018 348/30 |

(Continued)

*Primary Examiner* — Jay Patel
*Assistant Examiner* — Irfan Habib
(74) *Attorney, Agent, or Firm* — Haynes and Boone, LLP

(57) ABSTRACT

A method for improved calibration of captured infrared data values by an IR imaging system in a thermography arrangement dependent on an infrared (IR) image depicting an observed real world scene. The IR image may be captured by a thermography arrangement including the IR imaging system, wherein infrared (IR) image is related to temperature dependent on IR calibration parameters. A predefined feature may be detected from the IR image, and the IR imaging system may be calibrated based on the predefined feature.

18 Claims, 5 Drawing Sheets

(56) References Cited

U.S. PATENT DOCUMENTS

| | | | | |
|---|---|---|---|---|
| 2007/0288177 | A1* | 12/2007 | Rothenfusser | G01N 25/72 702/40 |
| 2009/0245321 | A1* | 10/2009 | Ringermacher | G01N 25/72 374/5 |
| 2009/0250611 | A1* | 10/2009 | Strandemar | H04N 5/33 250/330 |
| 2010/0045809 | A1* | 2/2010 | Packard | G06T 7/0028 348/222.1 |
| 2010/0058222 | A1* | 3/2010 | Bergstrom | G06T 19/00 715/782 |
| 2011/0001809 | A1* | 1/2011 | McManus | G01J 5/02 348/61 |
| 2011/0122251 | A1* | 5/2011 | Schmidt | G06K 9/2018 348/164 |
| 2011/0211073 | A1* | 9/2011 | Foster | H04N 5/232 348/164 |
| 2012/0148164 | A1* | 6/2012 | Suk | G06K 9/46 382/201 |
| 2013/0307991 | A1* | 11/2013 | Olsen | H01L 27/14649 348/164 |
| 2014/0044340 | A1* | 2/2014 | Phan | G01J 5/026 382/154 |

* cited by examiner

FACILITATING IMPROVED CALIBRATION OF CAPTURED INFRARED DATA VALUES BY AN IR IMAGING SYSTEM IN A THERMOGRAPHY ARRANGEMENT

CROSS-REFERENCE TO RELATED APPLICATIONS

This application claims priority to and the benefit of U.S. Provisional Patent Application No. 61/843,863 filed Jul. 8, 2013 and entitled "FACILITATING IMPROVED CALIBRATION OF CAPTURED INFRARED DATA VALUES BY AN IR IMAGING SYSTEM IN A THERMOGRAPHY ARRANGEMENT," which is hereby incorporated by reference in its entirety.

TECHNICAL FIELD

Generally, embodiments of the present disclosure relate to the technical field of thermographic imaging. More specifically, different embodiments of the disclosure relates to facilitating or enabling improved calibration of an infrared (IR) imaging system in a shutterless thermography arrangement.

BACKGROUND

In a thermography arrangement, such as an IR camera, various environmental factors and other sources may influence or otherwise affect previously calibrated measurement accuracy of the thermography arrangement. For example, an original calibration of an IR camera or module may no longer be suitable (e.g., no longer producing accurate radiometric measurements) due to heat from nearby electronic components or other sources within a case that houses an IR camera or module. In another example, an original calibration may not be suitable for some thermal environments to which the IR camera or module may be subjected in field use (e.g., thermographic applications outside in a cold winter weather). Also, various characteristics of various components of the IR camera or module may change with passage of time and/or with use, which may lead to calibration drifts (e.g., temperature drifts) and/or non-uniformities in captured infrared images.

To correct for such non-uniformities and temperature drifts in conventional systems, a mechanically operated calibration shutter mounted immediately in front of infrared detectors is raised into position in front of the detectors to block off all incoming energy from a real world scene, and allow the detector to be calibrated against a fixed smooth source with a uniform known temperature. This calibration is required at intervals varying from a few seconds to a few minutes, depending on the factors that cause detector drift at any time.

In one conventional method for calibrating an infrared imaging system, a mechanical shutter is initially used. The infrared imaging system thereafter relies on an imager algorithm that functions with a calibration curve created for the imaging system, with the curve comprising a plot of system output versus target scene temperature. An initial base output is obtained with a closed shutter that is later used in conjunction with the calibration curve and real-time measurements from the imaging system, and the base output serves as a reference measurement in calculating the output of the detector elements attributable to the target scene on an ongoing basis without necessitating further actuation of the shutter.

However, the need for reduction of unnecessary moving parts, reducing system weight and power consumption has led to the development of thermography arrangements without a shutter (also referred to as "shutterless" arrangements) where the mechanical shutter is removed. The removal of the mechanical shutter requires new methods of calibration to address calibration issues related to IR radiation detection, such as temperature drifts of the detector and non-uniformities of the detector. For example, in a shutterless camera the initial reference measurement cannot be obtained as there is no known reference, such as a shutter, to obtain this initial reading from. In addition, conventional methods involving a calibration curve projecting non-uniformities and temperature drifts based, for example, on ambient temperature obtained typically in a controlled environment such as a laboratory, is not valid for all environments and types of uses that thermography arrangement might be subjected to.

Therefore, there exists a need for facilitating or enabling improved calibration of captured infrared data values by an IR imaging system in a shutterless thermography arrangement.

SUMMARY

Various techniques are disclosed herein for systems and methods to facilitate or enable improved calibration of captured infrared data values by an IR imaging system in a shutterless thermography arrangement. For example, various embodiments of the systems and methods disclosed herein may achieve improved calibration of captured infrared data values by an IR imaging system in a shutterless thermography arrangement by determining that a predefined feature is represented in a VL or IR image.

According to one or more embodiments of the disclosure, a method may be performed to enable improved calibration of captured infrared data values by an IR imaging system in a thermography arrangement based on an infrared (IR) image depicting an observed real world scene, said IR image being captured by the thermography arrangement comprising said IR imaging system, wherein said IR image is associated with a temperature dependent on IR calibration parameters. In various embodiments, the method may include: capturing an IR image depicting the observed real world scene using the IR imaging system, wherein the captured IR image comprises IR pixels, wherein the IR pixels comprises the captured infrared data values from the observed real world scene and associated IR representation pixels of a visual representation representing temperature values of the captured infrared data; determining that a predefined feature is represented by the IR pixels in the IR image; obtaining a second subset of said IR pixels representing said predefined feature; and calibrating said IR imaging system based on the captured infrared data values associated with said second subset of said IR pixels and a predetermined temperature value associated to said predefined feature.

According to one or more embodiments of the disclosure, a method may be performed to enable improved calibration of captured infrared data values by an IR imaging system in a thermography arrangement based on associated infrared (IR) image data and visible light (VL) image data depicting a observed real world scene, said IR image and VL image being captured using the thermography arrangement comprising said IR imaging system and said VL imaging system, wherein said IR imaging system and said VL imaging system are configured to capture images of substantially the same observed real world scene, wherein said IR image is associated with a temperature dependent on IR calibration parameters.

In various embodiments, the method may include: capturing the IR image depicting the observed real world scene using the IR imaging system, wherein the captured IR image comprises the captured infrared data values (IDV) of IR radiation emitted from the observed real world scene and associated IR pixels of a visual representation representing temperature values of the captured infrared data; capturing a VL image depicting the observed real world scene using the VL imaging system, wherein the captured VL image comprises VL pixels of a visual representation of captured visual light image; determining that a predefined feature is represented by VL pixels in the VL image; obtaining a first subset of said VL pixels representing said predefined feature and pixel coordinates of the obtained first subset of VL pixels; obtaining a second subset of said IR pixels representing the determined predefined feature in the IR image by performing a VL-image to IR image coordinate transform; and calibrating said IR imaging system based on the captured infrared data values comprised in said second subset of said IR pixels and a predetermined temperature value associated with said predefined feature.

Embodiments of the invention further include the method, wherein the calibrating said IR imaging system comprises retrieving current IR calibration data parameters and generating updated IR calibration data parameters based on the captured infrared data values associated with the second subset of said IR pixels, the current IR calibration data parameters, and the predetermined temperature value.

Embodiments of the invention further include the method, wherein the generating the updated IR calibration data parameters comprises adapting the current IR calibration data parameters so that the difference between the captured infrared data values of the second subset of said IR pixels, together with the current IR calibration data parameters and the predetermined temperature value is minimized.

Embodiments of the invention further include the method, wherein the calibrating said IR imaging system further comprises retrieving current IR calibration data parameters.

Embodiments of the invention further include the method, wherein the calibrating said IR imaging system further comprises storing the generated updated IR calibration data parameters as the current IR calibration data parameters.

Embodiments of the invention further include the method, wherein obtaining the first subset of said VL pixels further comprises estimating the distance $SCENE_{dist}$ from the thermography arrangement to the observed real world scene.

Embodiments of the invention further include the method, wherein the estimating the distance $SCENE_{dist}$ is dependent on the size of the first subset of said VL pixels.

Embodiments of the invention further include the method, wherein said predetermined temperature value is dependent on the estimated distance $SCENE_{dist}$ from the thermography arrangement to the observed real world scene.

Embodiments of the invention further include the method, wherein the generating the updated IR calibration data parameters is based on the candidate IR calibration data parameters and weighting parameters.

Embodiments of the invention further include the method, wherein the generating updated IR calibration data parameters comprises calculating a weighted sum based on the candidate IR calibration data parameters and the weighting parameters.

Embodiments of the invention further include the method, wherein the weighted sum is calculated as:

$$\sum_{i=-N}^{0} W_i * CALPRM_{Ti}$$

Embodiments of the invention further include the method, wherein the obtaining the second subset further comprises obtaining the IR pixels at multiple successive times, when it is determined that a predefined feature is represented by the VL pixels in the VL image, and temporally filtering said IR pixels obtained at the multiple successive times.

According to one or more embodiments of the disclosure, a thermography arrangement is provided which may be configured to enable improved calibration of captured infrared data values by an IR imaging system based on an infrared (IR) image depicting an observed real world scene, said IR image being captured by the thermography arrangement comprising said IR imaging system, wherein the infrared (IR) image is associated with a temperature dependent on IR calibration parameters.

In various embodiments, said arrangement may include a processor arranged to capture the IR image depicting the observed real world scene using the IR imaging system, wherein the captured IR image comprises IR pixels, wherein the IR pixels comprises the captured infrared data values from the observed real world scene and associated IR representation pixels of a visual representation representing temperature values of the captured infrared data; determine that a predefined feature is represented by the IR pixels in the IR image; obtain a second subset of said IR pixels representing said predefined feature; and calibrate said IR imaging system based on the captured infrared data values associated with said second subset of said IR pixels and a predetermined temperature value associated to said predefined feature; and a memory configured to store said IR image.

According to one or more embodiments of the disclosure, a thermography arrangement is provided which may be configured to enable improved calibration of an IR imaging system in the thermography arrangement based on associated infrared (IR) image data and visible light (VL) image data depicting a observed real world scene, said IR image and VL image being captured using the thermography arrangement comprising said IR imaging system and a VL imaging system, wherein said IR imaging system and said VL imaging system may be configured to capture images of substantially the same observed real world scene, wherein infrared (IR) image is associated with a temperature dependent on IR calibration parameters.

In various embodiments, said arrangement may include: a processor arranged to: capture the IR image depicting the observed real world scene using the IR imaging system, wherein the captured IR image comprises captured infrared data values of IR radiation emitted from the observed real world scene and associated IR pixels of a visual representation representing temperature values of the captured infrared data; capture a VL image depicting the observed real world scene using the VL imaging system, wherein the captured VL image comprises VL pixels of a visual representation of captured visual light image; determine that a predefined feature is represented by the VL pixels in the VL image; obtain a first subset of said VL pixels representing said predefined feature and pixel coordinates of the obtained first subset of VL pixels; obtain a second subset of the IR pixels representing the determined predefined feature in the IR image by performing a VL-image to IR image coordinate transform; and calibrate said IR imaging system based on the captured infrared data values comprised in said second subset of said IR pixels and a predetermined temperature value associated to said predefined feature; and a memory configured to store said IR image and said VL image.

Embodiments of the invention further include the thermography arrangement, wherein the memory is a volatile memory that is: integrated in the thermography arrangement; or coupled to the thermography arrangement; or integrated in an external unit configured to receive data from, and/or transfer data to, the thermography arrangement.

Embodiments of the invention further include the thermography arrangement, wherein the processor is configurable using a hardware description language (HDL).

Embodiments of the invention further include the thermography arrangement, wherein the processor is a field-programmable gate array (FPGA).

Embodiments of the invention further include the thermography arrangement, wherein the processor further is adapted to perform all or part of the various embodiments of the methods disclosed herein.

According to one or more embodiments of the disclosure, a computer program product is provided, which may comprise code portions adapted to control a processor to perform any or part of the various embodiments of the methods disclosed herein.

Embodiments of the invention further include the computer program product comprising configuration data adapted to configure a field-programmable gate array (FPGA) to perform any or part of the various embodiments of the methods disclosed herein.

According to one or more embodiments of the disclosure, a computer-readable medium is provided, on which is stored non-transitory information adapted to control a processor to perform any or part of the various embodiments of the methods described herein.

Other embodiments of the invention relate to computer-readable mediums and computer program products, on which are stored non-transitory information for enabling improved calibration of captured infrared data values by an IR imaging system in a thermography arrangement.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Introduction

Figure 1:
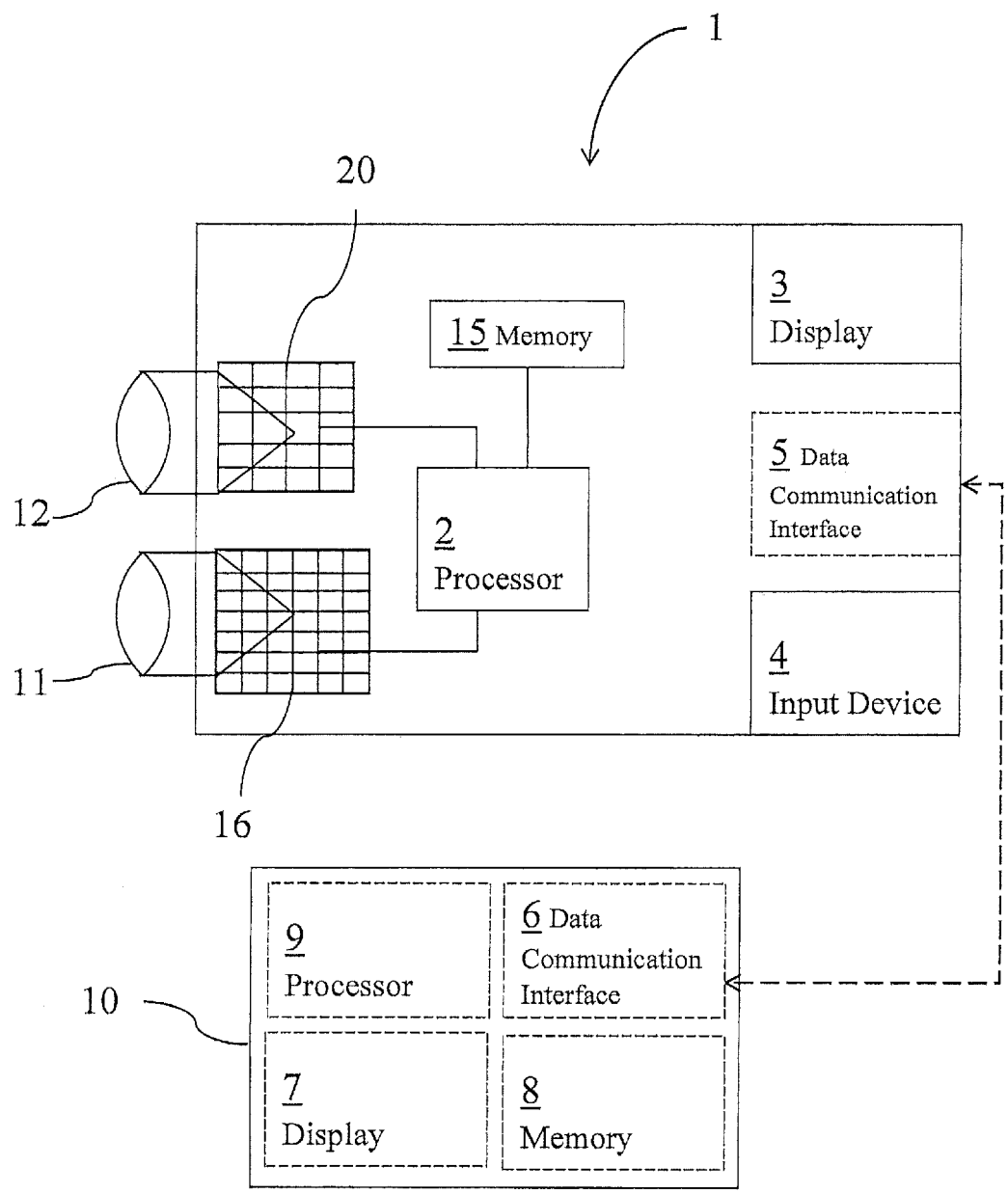
FIG. 1 shows a schematic view of a thermography arrangement in accordance with an embodiment of the disclosure.

In accordance with one or more embodiments, methods described herein may ensure improved calibration of measured radiometric data in the form of captured infrared data values by an IR imaging system in a shutterless (i.e., operating without a mechanical shutter blocking incoming IR radiation) thermography arrangement based on associated infrared (IR) image data and visible light (VL) image data depicting an observed real world scene Calibration of a Thermography Arrangement As is known, thermography arrangements with an IR imaging system generally employ a lens working with a corresponding infrared IR detector to provide an image of a view of an observed real world scene. The operation of such cameras is generally as follows. Infrared energy is accepted via infrared optics, including the lens, and directed onto the detector elements, for example comprising a micro-bolometer focal plane array. Each detector element responds to the infrared radiation or heat energy received. A frame of infrared (IR) image values may, for example, be captured by scanning all the rows and columns of the detector to obtain a captured IR image comprising IR pixels comprising captured infrared data representing IR radiation emitted from the observed real world scene. Optionally capturing an IR image comprising IR pixels might involve generating a visual representation, wherein the visual representation comprises associated IR representation pixels representing temperature values of the captured infrared data. The temperature values of the IR representation pixels are typically related to the infrared data values of the IR pixels by a predetermined temperature relation (PTR) and IR calibration data parameters. A dynamical IR image can be generated by repeatedly scanning the detector to form successive frames of IR data, with such frames being produced at a rate sufficient to generate a video representation of the thermal image data. In one non limiting example frames are being produced with a frame rate between 20-500 frames/second.

Certain characteristics of IR radiation sensors cause measurement errors resulting in reduced measurement accuracy. Individual detector elements have unique response characteristics. These response characteristics are found to produce non-uniformities, which result in noise. Additionally, heat generated internally by the thermography arrangement and the environment surrounding the thermography arrangement causes temperature drifts which cause offsets in the captured infrared data compared to infrared radiation emitted from the observed real world scene.

Many infrared cameras have functionality to correct for such non-uniformities and temperature-drift effects. Such functionality may be referred to as calibration from here on. For example, some infrared cameras can automatically or manually perform offset compensation/calibration, which corrects for the effects mentioned above by observing a uniform IR or thermal scene, e.g., by placing a shutter between the optics and the detector elements, and measuring offset correction data for each detector element which provides the desired uniform output response and obtaining a reading of the surrounding environment, e.g., measuring the ambient temperature. These measured non-uniformities corrections values and temperature drift offset correction values are stored as correction data in the form of IR calibration data parameters. The IR calibration data parameters and the predetermined temperature relation (PTR) are later applied in subsequent infrared measurements (e.g., with the shutter open) to correct for the measurement error described above.

The same correction data, from here on denoted IR calibration data parameters, for each detector element which provides the desired compensated output response is required for shutterless thermography arrangements. Said IR calibration data parameters might be in the form of offset maps and gain maps, used to correct offset and temperature dependent gain measurement errors.

System Architecture

FIG. 1 shows a schematic view of an embodiment of a thermography arrangement 1 for facilitating or enabling improved calibration of an infrared (IR) imaging system based on infrared (IR) image data in an IR image comprising IR pixels representing IR radiation emitted from an observed real world scene. In one or more embodiments, the calibration of an infrared (IR) imaging system is further based on visible light (VL) image data in an associated VL image comprising VL pixels representing VL emitted from said observed real world scene, wherein said IR image and said VL image depicts substantially the same real world scene.

In one or more embodiments, the thermography arrangement 1 comprises an IR imaging system 12 comprising a lens and an IR sensor 20, the IR imaging system 12 being configured to capture an IR image of the real world scene according to a first field of view. In one or more embodiments, the thermography arrangement 1 further comprises a VL imaging system 11 comprising a lens and a visible light (or visual light) sensor 16, the VL imaging system 11 being configured to capture a visible light image according to a second field of view. In one or more embodiments, the first and second fields of view are substantially the same.

In one or more embodiments, the IR imaging system 12 comprised in the thermography arrangement 1 is configured to capture infrared (IR) image data in an IR image comprising IR pixels representing IR radiation emitted from an observed real world scene. In one or more embodiments, a visible light (VL) imaging system 11 comprised in said thermography arrangement 1 is configured to capture visible light (VL) image data in a VL image comprising VL pixels representing VL emitted from said observed real world scene, wherein said IR image and said VL image depicts substantially the same real world scene, in a manner that would be understood by one skilled in the art.

In one or more embodiments, the thermography arrangement 1 further comprises a processor or processing unit 2/9 configured to perform all or part the methods described herein. In one or more embodiments, the one or more captured IR and/or VL images are transmitted to the processor 2/9 configured to perform image processing operations.

In one or more embodiments, the processor 2 is integrated in the thermography arrangement 1. In one or more embodiments, the processor 9 is external to said thermography arrangement 1, communicatively coupled to said thermography arrangement 1 and configured to send/receive data transferred to/from the thermography arrangement 1.

In one or more embodiments, the processor 2 is arranged to receive a captured IR image from said IR imaging system. In one or more embodiments, the processor 2 is arranged to receive a captured VL image from said VL imaging system. In one or more embodiments, the one or more captured IR and/or VL images are transmitted with possible intermediate storing to a processing unit separate or external from the imaging device.

In one or more embodiments, said processor 2 integrated in said thermography arrangement 1 or external to thermography arrangement 1 is provided with specifically designed programming or program code portions adapted to control the processing unit or processor to perform the steps and functions of embodiments of the inventive method, as further described herein. In one or more embodiments, the processor 2 is arranged to process a captured IR image such that a processed captured IR image is obtained that comprises captured infrared data from the observed real world scene, associated IR calibration data and optionally associated IR pixels of a visual representation representing temperature values of the captured infrared data in manners that would be understood by one skilled in the art.

In one or more embodiments, the thermography arrangement 1 further comprises at least one memory for storing the data registered or processed by the thermography arrangement 1. In one or more embodiments, the memory may be a memory 15 that is integrated in or coupled to the thermography arrangement and/or a memory 8 that is integrated in an external unit configured to receive data from, and/or transfer data to, the thermography arrangement 1.

In one or more embodiments, the thermography arrangement 1 further comprises a selection of one or more input devices 4 for inputting commands and/or control signals, e.g., an interactive display, joystick and/or record/push-buttons. In response to input commands and/or control signals, the processor 2 controls functions of the different parts of the thermography arrangement 1.

In one or more embodiments, the thermography arrangement 1 comprises or is coupled to a data communication interface 5 configured to communicate data to an external unit 10 and thereby enable a user to access and/or display the associated images using an external unit 10. In one or more embodiments, the external unit 10 comprises a processing unit 9 configured to perform all or part of the methods described herein. In one or more embodiments, the thermography arrangement 1 may comprise a display 3 configured to display at least one of the associated IR and VL images.

Determining a Predefined Feature in a VL Image

According to embodiments, the processor 2 is arranged to determine that a predefined feature is represented by VL pixels in the VL image and obtaining a first subset of said VL pixels representing said predefined feature and pixel coordinates of the obtained VL pixels.

In one or more embodiments, determining that predefined feature is represented by VL pixels in the VL image is performed by using feature detection involving computing abstractions of image information and making local decisions at every image point whether there is an image feature of a given type at that point or not and obtain a first subset of said VL pixels representing said predefined feature and pixel coordinates of the obtained VL pixels In one or more embodiments determining that predefined feature is represented by VL pixels in the VL image is performed by using a facial recognition system in a suitable manner that would be understood by one skilled in the art.

In one example, when it is determined that the predefined feature relates to a face a first subset of said VL pixels representing said predefined feature and pixel coordinates of the obtained VL pixels are obtained.

In one example facial recognition is achieved by automatically identifying or verifying a person from a digital image or a video frame from a video source. One of the ways to do this is by comparing selected facial features from the image and a facial database in a suitable manner that would be understood by one skilled in the art, and obtain a first subset of said VL pixels representing said predefined feature and pixel coordinates of the obtained VL pixels.

Determining a Predefined Feature in an IR Image

According to embodiments, the processor 2 is arranged to determine that a predefined feature is represented by IR pixels in the IR image and obtaining a second subset of said IR pixels representing said predefined feature and pixel coordinates of the obtained IR pixels.

In one or more embodiments determining that predefined feature is represented by IR pixels in the IR image is performed by using feature detection involving computing abstractions of image information and making local decisions whether there is an image feature of a given type at that point or not and obtain a first subset of said IR pixels representing said predefined feature and pixel coordinates of the obtained IR pixels.

In one or more embodiments determining that predefined feature is represented by IR pixels in the IR image is performed by using a facial recognition system as would be understood by one skilled in the art. When it is determined that the predefined feature relates to a face a first subset of said IR pixels representing said predefined feature and pixel coordinates of the obtained IR pixels.

In one example facial recognition is achieved by automatically identifying or verifying a person from an IR image or an IR image frame from an IR image video source. One of the ways to do this is by comparing selected facial features from the image and a facial database as would be understood by one skilled in the art, and obtain a first subset of said IR pixels representing said predefined feature and pixel coordinates of the obtained IR pixels.

Determining a Second Subset

According to embodiments, the processor 2 is optionally arranged to determine a second subset of IR pixels, representing the predefined feature determined in the VL image, in the IR image by performing a VL-to-IR pixel coordinate transform.

In one or more embodiments the VL-to-IR pixel coordinate transform is dependent on the a first field of view of the IR imaging system 12 and a second field of view of the visible light (VL) imaging system 11 in suitable manners as would be understood by one skilled in the art.

In one example this VL-to-IR pixel coordinate transform is predefined in thermography arrangements and used when presenting or relating information in a captured VL image to a captured IR image, e.g., when presenting blended or fused images.

In one or more embodiments the VL-to-IR pixel coordinate transform is dependent on parallax pointing error, parallax distance error, the pixel resolution of the IR image, the pixel resolution of the VL image, the relative rotation of the IR image relative to the VL image, wherein the pointing error relates to the angular difference of the direction of the optical axis of the IR imaging system 12 and the direction of the optical axis of the visible light (VL) imaging system 11, wherein the parallax distance relates to the offset distance between the optical axis of the IR imaging system 12 and visible light (VL) imaging system 11, wherein pixel resolution of the IR image relates to the number of elements in the IR sensor 20 and the number of elements in the visible (or visual) light VL sensor 16, wherein a relative rotation relates to the rotation of the IR sensor 20 in relation to the optical axis of the IR imaging system 12 related to the rotation of visible (or visual) light VL sensor 16 in relation to the optical axis of visible light (VL) imaging system 11.

Calibrating the IR Imaging System

According to embodiments, the processor 2 is arranged to calibrate said IR imaging system dependent on the captured infrared data values associated with the second subset of said IR pixels and a predetermined temperature value. In one or more embodiments said predetermined temperature value is associated to said predefined feature.

In one exemplary embodiment the determined feature is a human face and the predetermined temperature value is a temperature value representing a statistical representation of a typical temperature of a human face, e.g. 35 degrees Celsius.

In one or more embodiments calibrating said IR imaging system comprises retrieving current, IR calibration data parameters, generate updated IR calibration data parameters dependent on relating the captured infrared data values associated with the second subset of said IR pixels with current IR calibration data parameters and the predetermined temperature value.

In one example, to generate updated IR calibration data parameters comprises adapting the current IR calibration data parameters so that the difference between the captured infrared data values, associated with the second subset of said IR pixels, together with current IR calibration data parameters and the predetermined temperature value is minimized. In one example, adapting the current IR calibration data parameters can be performed in a suitable manner that would be understood by one skilled in the art.

In one example adaption might be performed using any method of calculating an offset, minimum mean square error (MMSE), Bayesian estimator, mean squared error, minimum-variance unbiased estimator, orthogonality principle, Wiener filter, Kalman filter, Linear prediction or Zero forcing equalizer.

In one or more embodiments the IR calibration data parameters are temperature drift offset values and/or non-uniformities, also referred to as gain, offset corrections values.

In one or more embodiments calibrating said IR imaging system comprises retrieving current, IR calibration data parameters from memory 8 or 15 and storing generated updated IR calibration data parameters as current IR calibration data parameters in memory 8 or 15.

In one or more embodiments the predetermined temperature value is expressed as one of a temperature value in Celsius, a temperature value in Kelvin or an infrared data value of an element of the IR sensor 20.

According to an embodiment, the processor 2 is further configured to associate the resulting IR and visible light images. According to an embodiment, the processor 2 is configured to generate a data structure comprising the associated images, for example in the form of an image pair, be performed in a suitable manner that would be understood by one skilled in the art.

The processor 2 may be a processor such as a general or special purpose processing engine for example a microprocessor, microcontroller or other control logic that comprises sections of code or code portions, stored on a computer readable storage medium, that are fixed to perform certain tasks but also other sections of code, stored on a computer readable storage medium, that can be altered during use. Such alterable sections can comprise parameters that are to be used as input for the various tasks, such as the calibration of the thermography arrangement 1, the sample rate, or the filter for the spatial filtering of the images, among others.

According to an embodiment, the processor 2 is configurable using a hardware description language (HDL). According to an embodiment, the processor 2 is a field-programmable gate array (FPGA), i.e., an integrated circuit designed to be configured by the customer or designer after manufacturing and configurable using a hardware description language (HDL). For this purpose embodiments of the invention comprise configuration data configured to control an FPGA to perform the steps and functions of the method embodiments described herein.

In one or more embodiments, data is transferred or communicated between the thermography arrangement 1 and the external unit 10 via a data communication interface 5 of the thermography arrangement 1 and a corresponding data communication interface 6 of the external unit, the interfaces e.g., comprising wired or wireless connections, IRDA, Bluetooth, USB, Fire-Wire, etc. (e.g., one or more various types of interface standards). The one-way or two-way communication enabled by said interfaces 5, 6 is illustrated by a dashed arrow in FIG. 1.

In one or more embodiments, the display is a display 3 integrated in or couplable to the thermography arrangement 1. According to an embodiment, the display is an external display 7 integrated in or coupled to an external unit 10 and configured to receive data transferred from the thermography arrangement via the interfaces 5, 6 described above. The display 3, 7 is configured to display the associated images to the user for further analysis and interpretation. By enabling a user to access the associated images for display, analysis and interpretation of the image content of an associated IR image and VL image pair is intuitive as the VL image and the IR image are representations of the same real world scene according to the same field of view, meaning that a user viewing both images, or switching between the images, can easily and quickly relate the information presented in one image to the information presented in the other.

In one or more embodiments, the memory 15 is configured to store the image data, for example the associated images obtained from the processing described above. In one or more embodiments, the memory 15 may be integrated into the thermography arrangement 1 or coupled to the thermography arrangement 1 via wired or wireless communication. In one or more embodiments, the memory is an external memory 8 integrated in an external unit 10, the memory 8 being configured to receive and store data from the thermography arrangement 1. In one or more embodiments, memory 15 or memory 8 may either be a volatile memory or a non-volatile memory.

In this disclosure, the terms "computer program product" and "computer-readable storage medium" may be used generally to refer to media such as a memory 15 or the storage medium of processor 2 or an external storage medium. These and other forms of computer-readable storage media may be used to provide instructions to processor 2 for execution. Such instructions, generally referred to as "computer program code" (which may be grouped in the form of computer programs or other groupings), when executed, enable the thermography arrangement (e.g., IR camera) 1 to perform features or functions of embodiments of the current technology. Further, as used herein, "logic" may include hardware, software, firmware, or a combination of thereof.

In one or more embodiments, the processor 2 communicates with a memory 15 where parameters are kept ready for use by the processor 2, and where the images being processed by the processor 2 can be stored if the user desires. The one or more memories 15 may comprise a selection of a hard disk drive, a floppy disk drive, a magnetic tape drive, an optical disk drive, a CD or DVD drive (R or RW), or other removable or fixed media drive.

Method Embodiments

Method Embodiments for IR Image-Based Calibration

Figure 2:
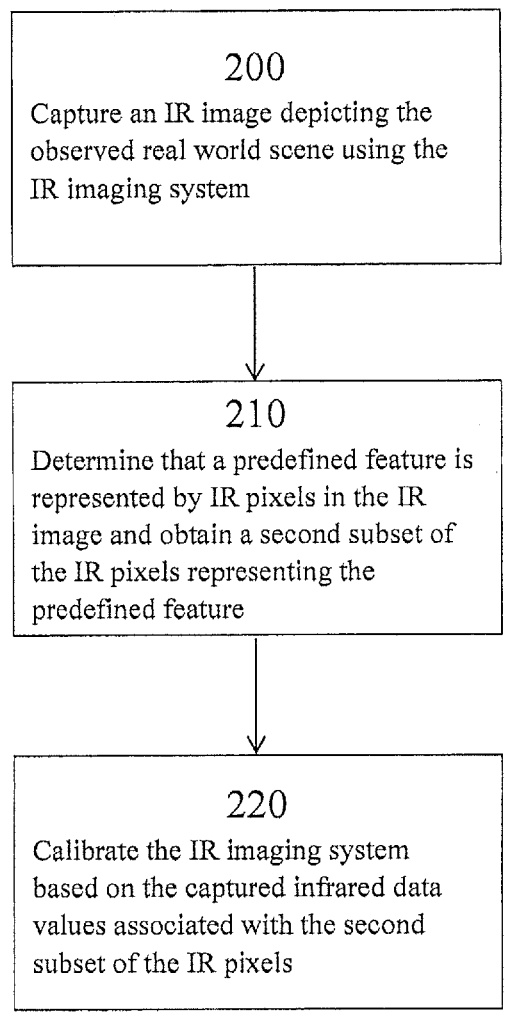
FIG. 2 is a flowchart of a method in accordance with an embodiment of the disclosure.

FIG. 2 shows a block diagram of a method according to one or more embodiments. According to an embodiment, a method for enabling improved calibration of infrared data values by an IR imaging system in a thermography arrangement dependent on an infrared (IR) image depicting an observed real world scene, said IR image being captured by a thermography arrangement comprising said IR imaging system, wherein infrared (IR) image is related to temperature dependent on IR calibration parameters comprises:

At block 200, capturing may be performed of an IR image depicting the observed real world scene using the IR imaging system, wherein the captured IR image comprises IR pixels, wherein IR pixels comprises captured infrared data values representing IR radiation emitted from the observed real world scene. In one or more embodiments, said IR pixels optionally further comprise associated IR representation pixels of a visual representation representing temperature values of the captured infrared data, having a first field of view. In one or more embodiments, the IR image is captured according to a first FOV.

At block 210, it may be determined that a predefined feature is represented by IR pixels in the IR image and obtaining a second subset of said IR pixels representing said predefined feature. In one or more embodiments, determining that predefined feature is represented by IR pixels in the IR image is performed by using feature detection involving computing abstractions of image information and making local decisions at every image point whether there is an image feature of a given type at that point or not and obtain a second subset of said IR pixels representing said predefined feature and pixel coordinates of the obtained IR pixels is obtained.

In one or more embodiments, determining that predefined feature is represented by IR pixels in the IR image is performed by using a facial recognition system as would be understood by one skilled in the art. When it is determined that the predefined feature relates to a face a second subset of said IR pixels representing said predefined feature and pixel coordinates of the obtained IR pixels is obtained.

In one example, facial recognition is achieved by automatically identifying or verifying a person from a digital image or a video frame from a video source. One of the ways to do this is by comparing selected facial features from the image and a facial database known per se in the art, e.g., in one or more conventional ways as would be understood by one skilled in the art, and obtain a second subset of said IR pixels representing said predefined feature and pixel coordinates of the obtained IR pixels is obtained.

In one or more embodiments, obtaining a second subset of IR pixels further comprises estimating the distance $SCENE_{dist}$ from the thermography arrangement to the observer real world scene. In one or more embodiments estimating the distance $SCENE_{dist}$ is dependent on a predetermined relation dependent on the size of the second subset of said IR pixels, in other words the number of IR pixels in the second subset.

In non-limiting example embodiment, a predetermined relation between a predetermined feature represented by a number of pixels and the distance from the thermography arrangement to the observed real world scene is obtained by calibration of the relation at design of the thermography arrangement, at fabrication/production of the thermography arrangement or when a activation of a calibration function is indicated by the user.

In one or more embodiments, determining that predefined feature is represented by IR pixels in the IR image is performed by determining that an external calibration source mode is activated and obtaining a second subset of said IR pixels representing said predefined feature by determining the location of an external calibration source mode marker associated to said IR image.

In one example, the location of the external calibration source mode marker is determined by an indication from the input device 4 from a user, e.g. by positioning a symbol, such as a circle, a cross or a rectangle, in a particular location in a displayed image and obtaining said subset of IR pixels as one or more IR pixels in this location or adjacent to said location.

In one example, the location of the external calibration source mode marker is predefined and said subset of IR pixels is obtained as one or more IR pixels in this location or adjacent to said location.

In one example, the location of the external calibration source mode marker is determined by the processor 2 evaluating a predetermined function based on said IR image to obtain a location, e.g. the IR pixel with the highest data value, i.e., temperature, and obtaining said subset of IR pixels as one or more IR pixels adjacent to said location.

In one example determining that an external calibration source mode is activated is performed by retrieving an external calibration source mode parameter from memory and comparing the parameter to a predefined value, e.g. a value 0 indicating the mode is de-activated and a value 1 indicating that the mode is activated.

In general said IR imaging system and VL imaging system will have certain physical characteristics associated to them, such as field of view (Fay), a focal length and depth of field (DOF). The field of view (also field of vision, abbreviated FOV) is the extent of the observable world that is seen at any given moment. The focal length of an optical system is a measure of how strongly the system converges or diverges light. For an optical system in air, it is the distance over which initially collimated rays are brought to a focus. The depth of field (DOF) is the distance between the nearest and farthest objects in a scene that appear acceptably sharp in an image. These characteristics are used in yet another embodiment of the invention.

In one or more embodiments, determining that predefined feature is represented by IR pixels in the IR image is performed by determining that an out of focus calibration mode is activated and obtaining a second subset of said IR pixels representing said predefined feature by selecting all pixels of the IR image. In one or more embodiments, where determining that an out of focus calibration mode is activated comprises receiving an indication signal from said input devices 4, wherein said indication signal is obtained in response to a user of said thermography arrangement 1 indicating the desire to preform out of focus calibration.

In one non-limiting example, the user is indicating the desire to preform out of focus calibration by pressing a switch, wherein said switch is located such that when a part of the human body of the user, such as a finger, activates the switch the part of the human body is located as to substantially fill the field of view of the imaging system and such that it is located outside the focal range and the depth of field of the imaging system, such that the image presented to the imaging system comprising an image of the human body having substantially no features therein discernible by said imaging system.

In one or more embodiments, where determining that an out of focus calibration mode is activated further comprises capturing a subsequent out of focus IR image of said observed scene such that it is located outside the focal range and the depth of field of the imaging system and obtaining an out of focus set of IR pixels.

At block 220, calibrating said IR imaging system based on the captured infrared data values associated with said second subset of said IR pixels may be performed. According to embodiments, the processor 2 is arranged to calibrate said IR imaging system dependent on the captured infrared data values associated with the second subset of said IR pixels and a predetermined temperature value associated to said predefined feature. In one or more embodiments, calibrating said IR imaging system comprises retrieving current, IR calibration data parameters, generate updated IR calibration data parameters dependent on captured infrared data values associated with the second subset of said IR pixels, current IR calibration data parameters and said predetermined temperature value.

In one example, generating updated IR calibration data parameters comprises adapting the current IR calibration data parameters so that the difference between the captured infrared data values of the second subset of said IR pixels, together with current IR calibration data parameters and the predetermined temperature value is minimized, as would be understood by one skilled in the art.

As previously mentioned certain characteristics of IR radiation sensors cause measurement errors which results in reduced measurement accuracy. Individual detector elements have unique response characteristics. These response characteristics are found to produce non-uniformities, which result in noise. Additionally, heat generated internally by the thermography arrangement and the environment surrounding the thermography arrangement causes temperature drifts which cause offsets in the captured infrared data compared to infrared radiation emitted from the observed real world scene. To compensate for varying response characteristics dependent on temperature for each detector element a gain map is used. To compensate for varying offset response characteristics for each detector element an offset map is used.

In one or more embodiments, IR calibration data parameters comprises an offset map, wherein said offset map comprises a number of data values equal to the number of IR pixels in said IR image. In one or more embodiments, IR calibration data parameters comprises a gain map, wherein said gain map comprises a number of data values equal to the number of IR pixels in said IR image.

In one or more embodiments, current IR calibration data parameters comprises an offset map (OM), a gain map (GM), a global offset (GO) and a global gain (GG).

In one or more embodiments, where compensated infrared data values (CIDV) are determined based on infrared data values and a predetermined compensation association relation.

In one or more embodiments, wherein said compensated infrared data values (CIDV) are determined based on the predetermined compensation association relation: $CIDV = (IDP-OM)*GM*GG+GO$ In one or more embodiments, where temperature values are determined based on a predetermined temperature relation (PTR), wherein said predetermined temperature relation is an approximation of an integral of Planck's law for the wavelengths where the IR imaging system is responsive.

In one or more embodiments, where infrared data values (CIDV) of a visual representation is associated to infrared data values (IDP) from the observed real world scene based on said temperature values.

In one or more embodiments, generate updated IR calibration data parameters comprises determining an updated global offset (UGO) based on said global offset (GO), the inverse function of said predetermined temperature relation (PTR), said predetermined temperature value and a first selected pixel value of said captured infrared data values associated with said second subset of said IR pixels, wherein said updated global offset (UGO) is determined as:

UGO=GO+(PTR$^{-1}$(predetermined temperature value)-PTR$^{-1}$(selected pixel value))

In one or more embodiments, generate updated IR calibration data parameters comprises determining an updated global gain (GG) based on global gain (GG), the inverse function of said predetermined temperature relation (PTR), said predetermined temperature value, a first and a second selected pixel value of said captured infrared data values associated with said second subset of said IR pixels, wherein said updated global gain (UGG) is determined as:

UGG=GG*(PTR$^{-1}$(predetermined temperature value)-PTR$^{-1}$(selected second pixel value))/ (PTR$^{-1}$(first selected second pixel value)- PTR$^{-1}$(second selected second pixel value))

In one or more embodiments, selecting a pixel value of said captured infrared data values associated with said second subset of said IR pixels is performed by determining a random pixel from said second subset, determining the maximum pixel value of said captured infrared data values associated with said second subset of said IR pixels, determining the minimum pixel value of said captured infrared data values associated with said second subset of said IR pixels, determining the average pixel value of said captured infrared data values associated with said second subset of said IR pixels or any other determining function as would be understood by a person skilled in the art.

According to embodiments, the processor 2 is arranged to calibrate said IR imaging system dependent on the captured infrared data values associated with the second subset of said IR pixels, a predetermined temperature value associated to said predefined feature, said out of focus set of IR pixels and an out of focus temperature value associated to said observed scene.

According to embodiments, said out of focus temperature value is associated to said observed scene by obtaining the ambient temperature.

According to embodiments, said out of focus predetermined temperature value is associated to said observed scene by obtaining a predetermined temperature value from memory.

In one or more embodiments calibrating said IR imaging system comprises retrieving current, IR calibration data parameters from memory 8 or 15

In one or more embodiments calibrating said IR imaging system comprises storing generated updated IR calibration data parameters as current IR calibration data parameters in memory 8 or 15.

In one or more embodiments calibrating said IR imaging system further comprises storing current IR calibration data parameters as original current IR calibration data parameters and storing generated updated IR calibration data parameters as current IR calibration data parameters in memory 8 or 15.

In one or more embodiments calibrating said IR imaging system further comprises storing original current IR calibration data parameters as current IR calibration data parameters in memory 8 or 15 upon receiving an indication from said input device 4 indicating a user's desire to return to previous calibration settings.

In one or more embodiments the predetermined temperature value is expressed as one of a temperature value in Celsius, a temperature value in Kelvin or an infrared data value of an element of the IR sensor 20.

Method Embodiments for VL to IR Transform-Based Calibration

Figure 3:
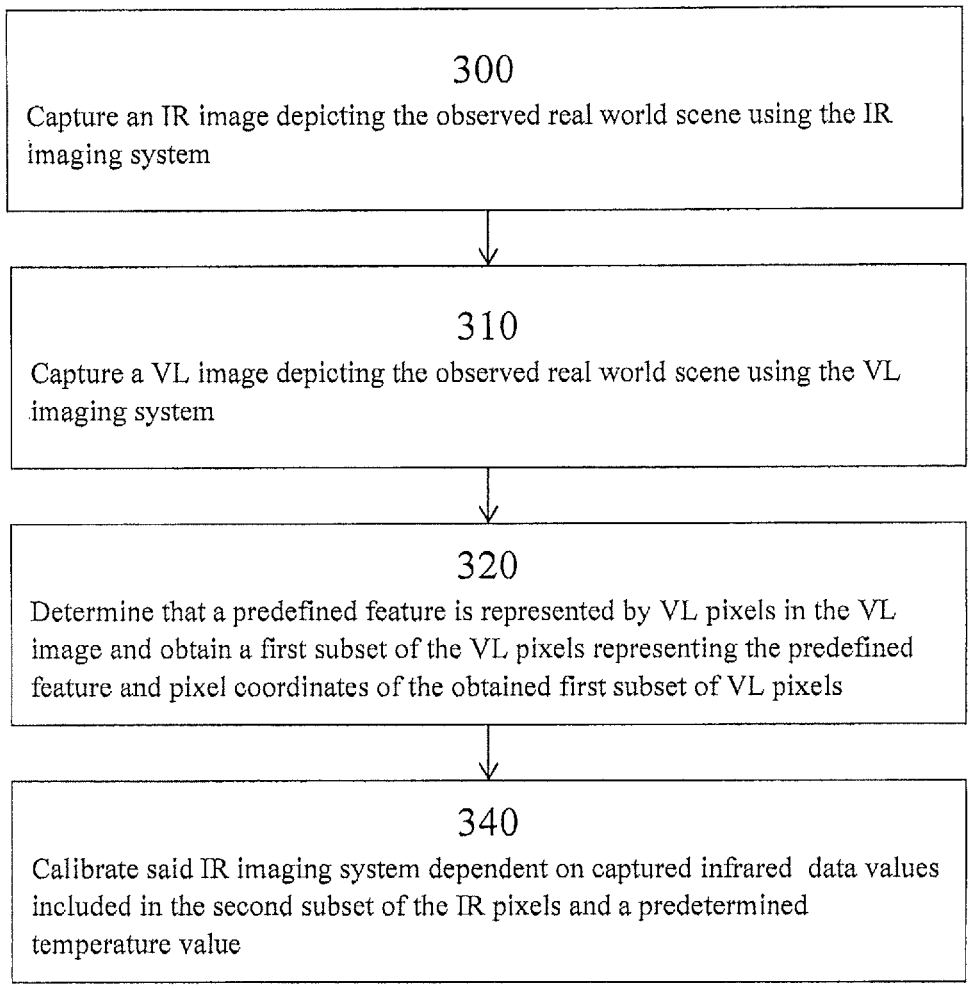
FIG. 3 is a flowchart of a method in accordance with another embodiment of the disclosure.

FIG. 3 shows a block diagram of a method according to one or more embodiments. According to an embodiment, a method for enabling improved calibration of captured infrared data values by an IR imaging system in a thermography arrangement dependent on associated infrared (IR) image data and visible light (VL) image data depicting a observed real world scene, said IR image and VL image being captured using a thermography arrangement comprising said IR imaging system and a VL imaging system, wherein said IR imaging system and said VL imaging system are configured to capture images of substantially the same observed real world scene, the method comprising:

At block 300: capturing an IR image depicting the observed real world scene using the IR imaging system, wherein the captured IR image comprises IR pixels, wherein IR pixels comprises captured infrared data values from the observed real world scene and associated IR representation pixels of a visual representation representing temperature values of the captured infrared data values. In one or more embodiments, capturing an IR image is performed in a suitable manner that would be understood by one skilled in the art.

At block 310: capturing a VL image depicting the observed real world scene using the VL imaging system, wherein the captured VL image comprises VL pixels of a visual representation of captured visual light image. In one or more embodiments, capturing a VL image is performed in a suitable manner that would be understood by one skilled in the art.

In one or more embodiments the VL image is captured according to a second field of view (FOV). In one or more embodiments the IR image is captured according to a first FOV. In one or more embodiments the VL image is captured according to a second field of view (FOV) and the IR image is captured according to a first FOV.

In one or more embodiments, the IR image and the visible light image are captured simultaneously. In one or more embodiments, the IR image and the visible light image are captured in close succession. In one or more embodiments, the IR image and the visible light image are captured at time instances further apart.

According to one or more embodiments, blocks 300 and 310 may be performed simultaneously, in close succession or at time instances further apart. Since it is preferable that the depicted scene has changed as little as possible between capture of the respective images, it is advantageous to capture the IR and VL image substantially simultaneously or in close succession. However, in a monitoring situation where the thermography arrangement is e.g. fixedly mounted or placed on a stand for monitoring of a fairly static scene over a longer period of time, also images captured at time instances further apart may comprise representations wherein the depicted scene has stayed more or less the same and therefore provide accurate comparison results.

According to an embodiment, the VL image and the IR image is associated. According to an embodiment, associating the image and the IR image images comprises creating an instance of a data structure comprising the two images. According to an embodiment, the associated images may further be stored, either stored temporarily on a transitory memory, e.g. for live or real-time viewing of the captured images at site, or stored more permanently on a non-transitory memory for later viewing and analysis, using a display 3 of the thermography arrangement 1 or a display 7 of an external unit 10.

According to an embodiment, the associated images are stored on a volatile memory that is either integrated in the thermography arrangement or coupled to the thermography arrangement. The volatile memory may e.g. be a RAM or cache storage. According to another embodiment, the associated images are stored on a non-volatile memory that is integrated in the thermography arrangement; coupled to the thermography arrangement; or integrated in an external unit configured to receive data from, and/or transfer data to, the thermography arrangement.

At block 320: determining that a predefined feature is represented by VL pixels in the VL image and obtaining a first subset of said VL pixels representing said predefined feature and pixel coordinates of the obtained first subset of VL pixels. In one or more embodiments, determining that predefined feature is represented by VL pixels in the VL image is performed by using feature detection in a suitable manner that would be understood by one skilled in the art. In one or more embodiments, feature detection involves computing abstractions of image information and making local decisions at every image point whether there is an image feature of a given type at that point or not and to obtain a first subset of VL pixels representing the predefined feature and pixel coordinates of the obtained first subset of VL pixels, as would be understood by one skilled in the art.

In one or more embodiments determining that a predefined feature is represented by VL pixels in the VL image is performed by using a facial recognition system known per se in the art, e.g., in one or more conventional ways as would be understood by one skilled in the art. When it is determined that the predefined feature relates to a face a first subset of VL pixels representing the predefined feature and pixel coordinates of the obtained first subset of VL pixels.

In one example facial recognition is achieved by automatically identifying or verifying a person from a digital image or a video frame from a video source. One of the ways to do this is by comparing selected facial features from the image and a facial database known per se in the art, e.g., in one or more conventional ways as would be understood by one skilled in the art, and obtain a first subset of VL pixels representing the predefined feature and pixel coordinates of the obtained first subset of VL pixels.

In embodiments obtaining a first subset of said VL pixels further comprises estimating the distance $SCENE_{dist}$ from the thermography arrangement to the observer real world scene. In one or more embodiments estimating the distance $SCENE_{dist}$ is dependent on the size of the first subset of said VL pixels, in other words the number of VL pixels in the first subset.

In one or more embodiments determining that predefined feature is represented by VL pixels in the VL image is performed by determining that an external calibration source mode is activated and obtaining a first subset of said VL pixels representing said predefined feature by determining the location of an external calibration source mode marker associated to said VL image.

In one example the location of the external calibration source mode marker is determined by an indication from the input device 4 from a user, e.g. by positioning a symbol, such as a circle, a cross or a rectangle, in a particular location in a displayed image and obtaining said first subset of VL pixels as one or more VL pixels in this location or adjacent to said location.

In one or more embodiments, where said location of the external calibration source mode marker is predefined and said first subset of VL pixels is obtained as one or more VL pixels in said location or adjacent to said location.

In one or more embodiments, where the location of the external calibration source mode marker is determined by the processor 2 evaluating a predetermined function based on said VL image to obtain a location, e.g. the VL pixel with the highest value, and obtaining said subset of IR pixels as one or more IR pixels adjacent to said location.

In one or more embodiments, where determining that an external calibration source mode is activated is performed by retrieving an external calibration source mode parameter from memory and comparing the parameter to a predefined value, e.g. a value 0 indicating the mode is de-activated and a value 1 indicating that the mode is activated.

At block 330: obtaining a second subset of IR pixels representing the determined predefined feature in the IR image by performing a VL-image to IR image coordinate transform. In one non-limiting example, the transform is standard transform for relating pixels in VL and IR images in a thermography arrangement known per se in the art, e.g., in one or more conventional ways as would be understood by one skilled in the art. In one non-limiting example, the transform is based on the first field of view of the IR imaging system and the second field of view of the VL imaging system.

According to one or more embodiments, the field of view may be determined using a known relationship/association between the imaging systems 11, 12, such as known parallax distance between the optical axis of the IR imaging system 12 and the VL imaging system 11, pointing error indicating an angle between the optical axes of the IR imaging system 12, relative difference in rotation around the optical axis of the IR imaging system 12 and the VL imaging system 11, the number of sensor elements (resolution) of the IR imaging system 12 and the VL imaging system 11 and/or the relationship between the FOV of the IR imaging system 12 and the VL imaging system 11. Said relationships/associations may have been determined during design, production or calibration of the thermography arrangement, as would be understood by one skilled in the art).

According to another embodiment the transform is based on an area or region within the FOV of the and the FOV of the VL imaging system 11 that may be identified for the VL image and the IR image using any known identification method, e.g. pattern recognition, edge detection, object recognition and/or cross-correlation techniques, just to mention a few.

In one or more embodiments the transform maps VL pixel coordinates to captured infrared data values coordinates. In one or more embodiments the transform maps VL pixels coordinates to IR representation pixel coordinates.

In one or more embodiments the captured infrared data values of the second subset of IR pixels is obtained through the association between captured infrared data values and IR representation pixels obtained from the transform.

In one or more embodiments the IR representation pixels of the second subset of IR pixels is obtained through the association between captured infrared data values and the IR representation pixels obtained from the transform. In one or more embodiments the association between captured infrared data values and the IR representation pixels is one to one. In one or more embodiments the association between captured infrared data values and the IR representation pixels is one to N, wherein N>1. In one or more embodiments the association between the IR representation pixels and captured infrared data values is one to N, wherein N>1.

In one non-limiting example the association is a table or any other method to associate values known per se in the art, e.g., in one or more conventional ways as would be understood by one skilled in the art.

In one non-limiting example the transform maps pixel coordinates of the obtained first subset of VL pixels to IR pixels, wherein the IR pixels comprises captured infrared data values and associated IR representation pixels, wherein the captured infrared data values and associated IR representation pixels represents areas in the observed real world scene depicted by the obtained first subset of VL pixels.

In one non-limiting example the transform maps pixel coordinates of the obtained first subset of VL pixels to captured infrared data values coordinates, thereby obtaining captured infrared data values of the second subset of IR pixels and obtaining IR representation pixels through the association between captured infrared data values and the IR representation pixels, wherein the captured infrared data values and associated IR representation pixels represents areas in the observed real world scene depicted by the obtained first subset of VL pixels.

In one non-limiting example the transform maps pixel coordinates of the obtained first subset of VL pixels to IR representation pixel coordinates, thereby obtaining IR representation pixels of the second subset of IR pixels and obtaining IR representation pixels through the association between IR representation pixels and the captured infrared data values, wherein the captured infrared data values and associated IR representation pixels represents areas in the observed real world scene depicted by the obtained first subset of VL pixels.

In embodiments obtaining a second subset of IR pixels further comprises estimating the distance $SCENE_{dist}$ from the thermography arrangement to the observer real world scene.

In one or more embodiments estimating the distance $SCENE_{dist}$ is dependent on the size of the second subset of said IR pixels, in other words the number of IR pixels in the second subset.

At block 340: calibrating said IR imaging system dependent on captured infrared data values comprised in said second subset of said IR pixels and a predetermined temperature value. According to one or more embodiments, calibrating said IR imaging system comprises to calibrate said IR imaging system dependent on the captured infrared data values of the second subset of said IR pixels and a predetermined temperature value associated to said predefined feature.

In one or more embodiments calibrating said IR imaging system comprises retrieving current, IR calibration data parameters, generate updated IR calibration data parameters dependent on captured infrared data values associated with the second subset of said IR pixels, current IR calibration data parameters and the predetermined temperature value.

In one example, generating updated IR calibration data parameters comprises adapting the current IR calibration data parameters so that the difference between the captured infrared data values of the second subset of said IR pixels, together with current IR calibration data parameters and the predetermined temperature value is minimized.

As previously mentioned certain characteristics of IR radiation sensors cause measurement errors which results in reduced measurement accuracy. Individual detector elements have unique response characteristics. These response characteristics are found to produce non-uniformities, which result in noise. Additionally, heat generated internally by the thermography arrangement and the environment surrounding the thermography arrangement causes temperature drift which causes offsets in the captured infrared data compared to infrared radiation emitted from the observed real world scene. To compensate for varying response characteristics dependent on temperature for each detector element a gain map is used. To compensate for varying offset response characteristics for each detector element an offset map is used.

In one or more embodiments, IR calibration data parameters comprises an offset map, wherein said offset map comprises a number of data values equal to the number of IR pixels in said IR image.

In one or more embodiments, IR calibration data parameters comprises a gain map, wherein said gain map comprises a number of data values equal to the number of IR pixels in said IR image.

In one or more embodiments, current IR calibration data parameters comprises an offset map (OM), a gain map (GM), a global offset (GO) and a global gain (GG).

In one or more embodiments, where compensated infrared data values (CIDV) are determined based on infrared data values and a predetermined compensation association relation.

In one or more embodiments, wherein said compensated infrared data values (CIDV) are determined based on the predetermined compensation association relation: CIDV=(IDP−OM)*GM*GG+GO.

In one or more embodiments, where temperature values are determined based on a predetermined temperature relation (PTR), wherein said predetermined temperature relation is an approximation of an integral of Planck's law for the wavelengths where the IR imaging system is responsive.

In one or more embodiments, where representation pixels of a visual representation is related to compensated infrared data values (CIDV) based on said predetermined temperature relation (PTR) said IR calibration data parameters.

In one or more embodiments, generate updated IR calibration data parameters comprises determining an updated global offset (UGO) based on said global offset (GO), the inverse function of said predetermined temperature relation (PTR), said predetermined temperature value and a first selected pixel value of said captured infrared data values associated with said second subset of said IR pixels, wherein said updated global offset (UGO) is determined as:

UGOM=GO+(PTR$^{-1}$(predetermined temperature value)−PTR$^{-1}$(selected pixel value))

In one or more embodiments, generate updated IR calibration data parameters comprises determining an updated global gain (GG) based on global gain (GG), the inverse function of said predetermined temperature relation (PTR), said predetermined temperature value, a first and a second selected pixel value of said captured infrared data values associated with said second subset of said IR pixels, wherein said updated global gain (UGG) is determined as:

UGG=GG*(PTR$^{-1}$(predetermined temperature value)−PTR$^{-1}$(selected second pixel value))/

(PTR$^{-1}$(first selected second pixel value)−
PTR$^{-1}$(second selected second pixel value))

In one or more embodiments, selecting a pixel value of said captured infrared data values associated with said second subset of said IR pixels is performed by determining a random pixel from said second subset, determining the maximum pixel value of said captured infrared data values associated with said second subset of said IR pixels, determining the minimum pixel value of said captured infrared data values associated with said second subset of said IR pixels, determining the average pixel value of said captured infrared data values associated with said second subset of said IR pixels or any other determining function as would be understood by a person skilled in the art.

In one or more embodiments, calibrating said IR imaging system further comprises retrieving current, IR calibration data parameters from memory 8 or 15

In one or more embodiments, calibrating said IR imaging system comprises storing generated updated IR calibration data parameters as current IR calibration data parameters in memory 8 or 15.

In one or more embodiments, the predetermined temperature value is expressed as one of a temperature value in Celsius, a temperature value in Kelvin or an infrared data value of an element of the IR sensor 20.

In one or more embodiments, the temperature value is predetermined. In embodiments the predetermined temperature value is retrieved from memory, 8 or 15.

In one or more embodiments the predetermined temperature value is dependent of an estimated distance SCENE$_{dist}$ from the thermography arrangement to the observer real world scene. In one non-limiting example, the effect of distance dependent results when capturing an IR image of an object is reduced by adapting the predetermined value dependent on an estimated distance SCENE$_{dist}$ from the thermography arrangement to the observer real world scene, i.e., as an object will appear to be colder or warmer dependent on the distance to the object that the IR image is captured a reference value obtained from this object must be compensated for when determining Alternative Embodiments Weighting It might be desirably to reduce sudden changes of parameters when generating updated IR calibration data parameters, due to temporary measurement conditions such as an erroneous detection of a predetermined feature, e.g. a human face or individual features thereof. To limit the effect of these effects historically generated IR calibration data parameters, from here on referred to as candidate IR calibration data parameters, might be taken into account. In one example, newer candidate IR calibration data parameters might be considered more than older candidate IR calibration data parameters by applying weights.

In one or more embodiments, wherein generating updated IR calibration data parameters further comprises; generating a candidate IR calibration data parameter CALPRM$_{T0}$ for the current time T0 of determining that a predefined feature is present in the VL image; retrieving N stored previous candidate IR calibration data parameters CALPRM$_{T-N}$, . . . , CALPRM$_{T-2}$, CALPRM$_{T-1}$, generated at previous determinations that a predefined feature is present in the VL image; retrieving weighting parameters [W$_{-N}$, . . . , W$_{-2}$, W$_{-1}$, W$_{0}$] indicating the weight applied to candidate IR calibration data parameters when generating updated IR calibration data parameters; generating updated IR calibration data parameters dependent on candidate IR calibration data parameters CALPRM$_{T-N}$, . . . , CALPRM$_{T-1}$, CALPRM$_{T-0}$ and the weighting parameters [W$_{-N}$, . . . , W$_{-2}$, W$_{-1}$, W$_{0}$]; and storing the generated candidate IR calibration data parameters CALPRM$_{T0}$.

In one or more embodiments the weighting parameters is dependent on time difference from current time. In one or more embodiments the weighting parameters is dependent on a measure of reliability of the corresponding candidate IR calibration data parameters. The reliability value might be calculated in a suitable manner that would be understood by one skilled in the art.

In one or more embodiments the updated IR calibration data parameters is calculated as a weighted sum and the weights are determined as 1/N, wherein N is the number of candidate IR calibration data parameters considered when generating updated IR calibration data parameters, i.e., equal dependency for the generated updated IR calibration data parameters on current and previous candidate IR calibration data parameters.

In one or more embodiments the updated IR calibration data parameters is calculated as a weighted sum and the weights are determined as increasing dependency for the generated updated IR calibration data parameters on newer candidate IR calibration data parameters. In one or more embodiments, the weighted sum is calculated as:

$$\sum_{i=-N}^{0} W_i * CALPRM_{Ti}$$

In one example the updated IR calibration data parameters is calculated as a weighted sum and the weights are determined a measure of deviation of the candidate IR calibration data parameters CALPRM$_{T0}$ to previous candidate IR calibration data parameters CALPRM$_{T-N}$, . . . , CALPRM$_{T-2}$, CALPRM$_{T-1}$, generated at previous determinations that a predefined feature is present in the VL image.

In one non-limiting example the measure of deviation is the difference of CALPRM$_{T0}$ the average values, median values or N-percentile values of CALPRM$_{T-N}$, . . . , CALPRM$_{T-2}$, CALPRM$_{T-1}$ Temporal Filtering In one or more embodiments, obtaining a second subset further comprises obtaining IR pixels at multiple successive times, when it is determined that a predefined feature is represented by VL pixels in the VL image, and temporally filtering said IR pixels obtained at multiple successive times. Temporally filtering might be performed in a suitable manner that would be understood by one skilled in the art.

In one or more embodiments image stabilization is performed before temporally filtering said IR pixels at multiple successive times. Image stabilization might be performed in a suitable manner that would be understood by one skilled in the art.

Display

There may be provided a user interface enabling the user to interact with the captured data, e.g., on one of the displays 3, 7. Such a user interface may comprise selectable options or input possibilities allowing a user to switch between different views, zoom in on areas of interest etc. In order to interact with the display, the user may provide input using one or more of the input devices 4.

According to an embodiment, a user may interact with the thermography arrangement 1 to perform zooming or scaling of one of the images, in manners known in the art, before storing or display of the images. If a user performs a zooming or scaling action on either the IR or the VL image, the field of view (FOV) of the associated image will be adjusted according to any of the method embodiments described herein. Thus, the FOV of the associated images will always be matched, either in real-time or near real-time to a user viewing the images on site, or in image data stored for later retrieval.

Use Case Embodiments

According to embodiments, a method for enabling improved calibration of captured infrared data values by an IR imaging system in a thermography arrangement dependent on an infrared (IR) image depicting an observed real world scene, said IR image being captured by a thermography arrangement comprising said IR imaging system, wherein infrared (IR) image is related to temperature dependent on IR calibration parameters. The method may include capturing an IR image depicting the observed real world scene using the IR imaging system, wherein the captured IR image comprises IR pixels, wherein IR pixels comprises captured infrared data values from the observed real world scene and associated IR representation pixels of a visual representation representing temperature values of the captured infrared data. The captured infrared pixels might comprise information on infrared information emitted from objects in the observed real world scene. Together with the IR calibration parameters the temperature value in Celsius or a temperature value in Kelvin can be determined.

The method may further include determining that a predefined feature is represented by IR pixels in the IR image and obtaining a second subset of said IR pixels representing said predefined feature. Determining that a predefined feature is represented by IR pixels in the IR image might comprise to identify that a particular feature, such as a human face, with a predetermined temperature value determined with a certain statistical probability is present in the IR image.

The method may further include calibrating said IR imaging system based on the captured infrared data values associated with said second subset of said IR pixels and a predetermined temperature value associated to said predefined feature. Calibrating said IR imaging system might comprise adapting the calibration parameters so that the difference between the predetermined temperature value and captured IR image IR pixels together with calibration parameters is minimized. In one or more embodiments, the IR calibration parameters comprises a temperature drift offset that and the updated calibration parameters as a temperature drift offset are calculated as the difference between IR pixels together with current calibration parameters and the predetermined temperature value. In one or more embodiments, the IR calibration parameters comprises a temperature drift offset that and the updated calibration parameters as a temperature drift offset are calculated as the difference between the captured infrared data values of the IR pixels together with current calibration parameters and the predetermined temperature value.

As may be appreciated by a person skilled in the art, display of pure IR or pure VL images are not the only options. For instance, fusion, blending or picture in picture may be used according to circumstances. According to an embodiment, the IR image displayed may instead of a pure IR image be a fused, blended or contrast enhanced version of the IR image, with addition of VL image data, generated in manners known in the art. However, an IR image is often hard to interpret in itself and also in blended or fused images it may be hard to relate the image content to the observed real world scene. Therefore, the possibility to switch to a VL representation wherein the FOV of the VL image coincides with the FOV of the previously displayed IR or combined image is very advantageous for interpretation.

According to an embodiment, the user may use an input device 4 to capture and/or store an associated IR image and VL image pair. In the eyes of the user, a single input action may thereby be performed. In response to the single user action, method steps according to any of the embodiments described herein are performed, leading to capturing, association, storing and/or displaying of images dependent on the preset or user selected settings of the thermography arrangement currently in operation.

Figure 4:
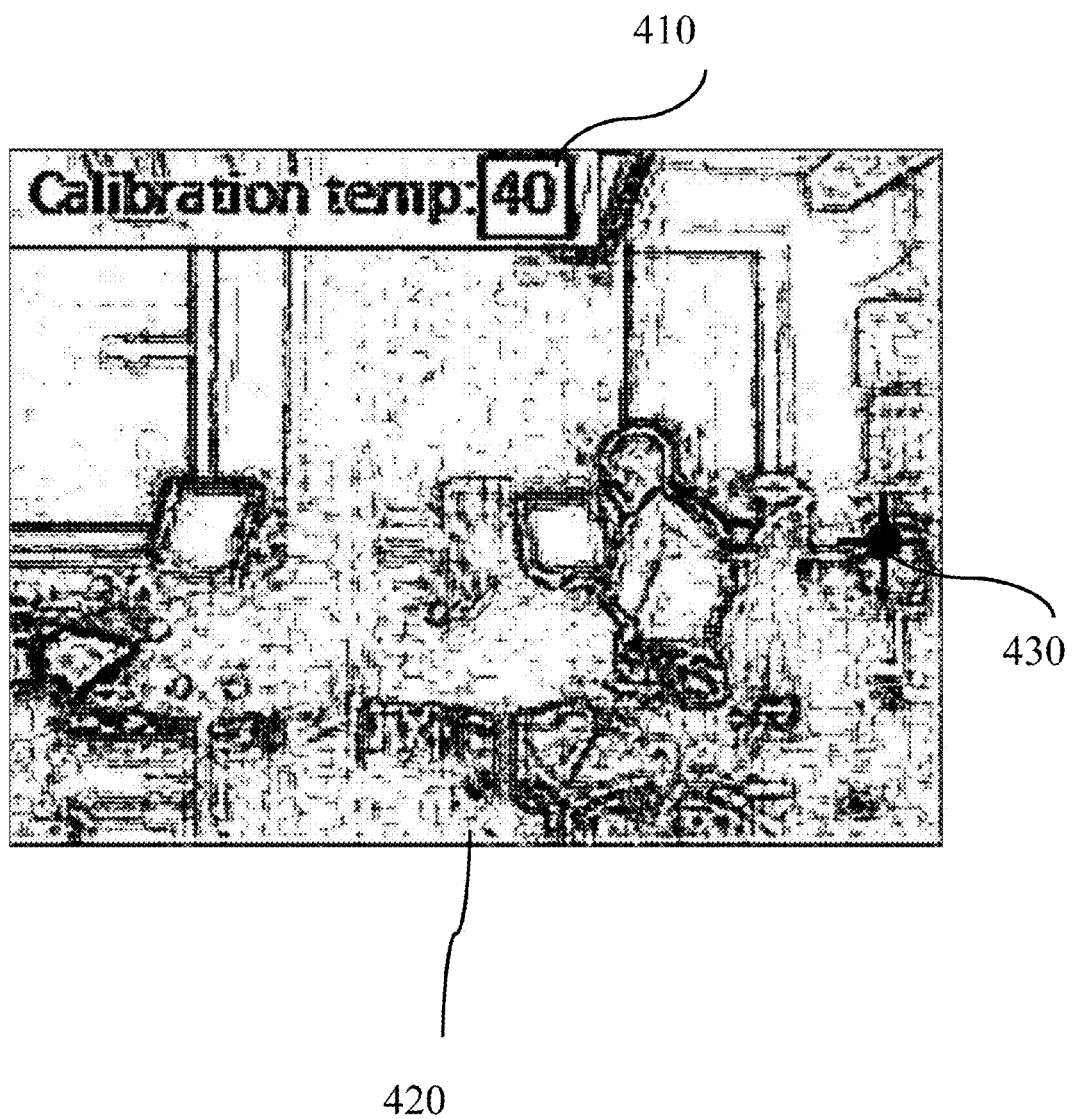
FIG. 4 shows an example of an infrared (IR) image in accordance with an embodiment of the disclosure, which may be viewed as an example method of use according to an embodiment of the disclosure, in particular to determine that a predefined feature is represented by VL pixels in the VL image and the calibration of said IR imaging system dependent on captured infrared data values.

Another example method of use according to an embodiment of the disclosure may be illustrated with reference to FIG. 4, which is an example of an infrared (IR) image in accordance with an embodiment of the disclosure. Determining that predefined feature is represented by IR pixels in the IR image is performed by determining that an external calibration source mode is activated and obtaining a second subset of said IR pixels representing said predefined feature by determining the location of an external calibration source mode marker 430 associated to said IR image.

Determining that an external calibration source mode is activated is performed by retrieving an external calibration source mode parameter from memory and comparing the parameter to a predefined value, e.g. a value 0 indicating the mode is de-activated and a value 1 indicating that the mode is activated.

When the external calibration source mode is activate, the IR image 420 might be displayed with an associated external calibration source mode marker overlaid onto the IR image. The location of the external calibration source mode marker might be determined e.g. by an indication from the input device 4 from a user positioning a symbol in a particular location in a displayed image, by a predefined location in the associated IR image or by the processor 2 evaluating a predetermined function based on said IR image to obtain a location, e.g. the IR pixel with the highest value, i.e., temperature. The predetermined temperature value 410 associated to said predefined feature might be displayed overlaid on the displayed IR image.

Obtaining said subset of IR pixels as one or more IR pixels in this location or adjacent to said location of the external calibration source mode marker. This may be performed by obtaining a single a single pixel in or adjacent to the associated external calibration source mode marker.

Figure 5:
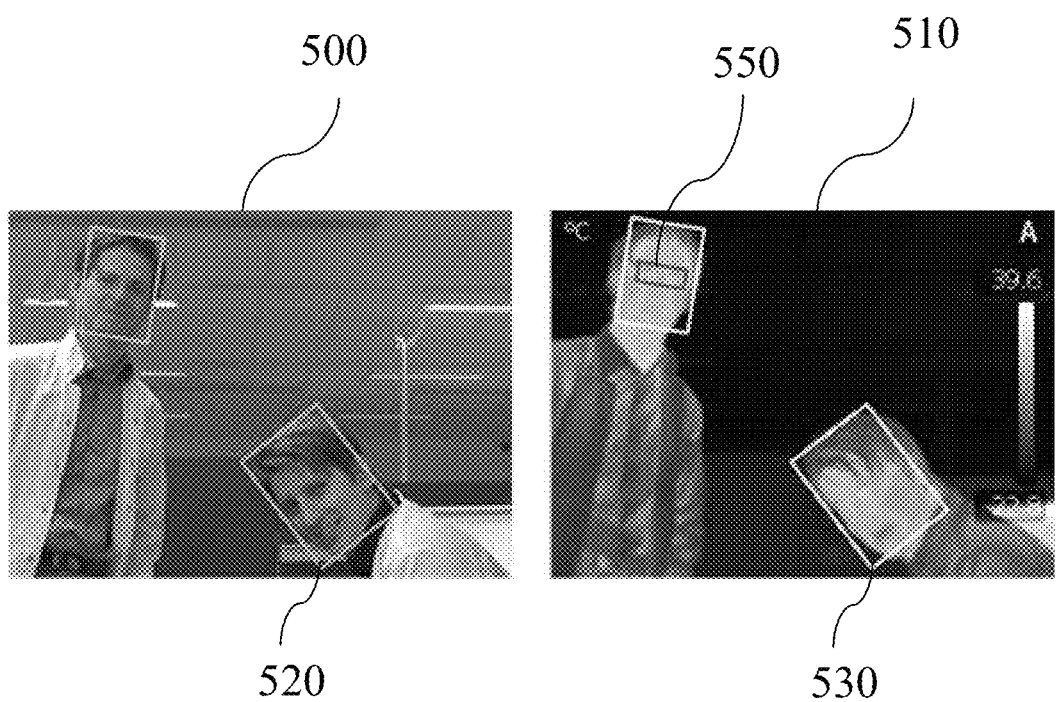
FIG. 5 shows an example of an image pair with a predefined feature in an infrared (IR) image data and visible light (VL) image, in accordance with an embodiment of the disclosure.

Another example method of use according to an embodiment of the disclosure may be illustrated with reference to FIG. 5, which shows an example of an image pair with a predefined feature in an infrared (IR) image data and visible light (VL) image, in accordance with an embodiment of the disclosure. The method enables improved calibration of captured infrared data values by an IR imaging system in a thermography arrangement dependent on associated infrared (IR) image data and visible light (VL) image data depicting a observed real world scene, said IR image 510 and VL image 500 being captured using a thermography arrangement comprising said IR imaging system and a VL imaging system, wherein said IR imaging system and said VL imaging system are configured to capture images of substantially the same observed real world scene.

The method may include capturing an IR image depicting the observed real world scene using the IR imaging system, wherein the captured IR image comprises IR pixels, wherein IR pixels comprises captured infrared data values from the observed real world scene and optional associated IR representation pixels of a visual representation representing temperature values of the captured infrared data values. The IR image might be captured using a thermography arrangement configured to capture radiometric data as infrared data values, as described above.

The method may further include capturing a VL image depicting the observed real world scene using the VL imaging system, wherein the captured VL image comprises VL pixels of a visual representation of captured visual light image. The VL image might be captured using the same thermography arrangement, also configured with a VL imaging system.

In one or more embodiments the IR image is captured according to a first FOV. The VL image is captured according to a second field of view (FOV) and the IR image is captured according to a first FOV wherein the differences between the first and second FOV is described in a VL-image to IR image coordinate transform. The IR image and the visible light image might be captured simultaneously, in close succession, or at time instances further apart.

According to an embodiment, the VL image and the IR image is associated, e.g. by creating or generating an instance of a data structure comprising the two images. According to an embodiment, the associated images may further be stored, either stored temporarily on a transitory memory or stored more permanently on a non-transitory memory.

The method may further include determining that a predefined feature 520 is represented by VL pixels in the VL image and obtaining a first subset of said VL pixels representing said predefined feature and pixel coordinates of the obtained first subset of VL pixels. This might be performed by detecting that a predefined feature, such as a human face, is represented by VL pixels in the VL image by facial recognition, as would be understood by a person skilled in the art.

The facial recognition is achieved by automatically identifying or verifying a person from a digital image or a video frame from a video source. One of the ways to do this is by comparing selected facial features from the image and a facial database as would be understood by a person skilled in the art. Alternatively a particular feature 550 of a human face might be identified as the first subset of said VL pixels, e.g. an eye, nose or the mouth. Such a particular feature may provide a more stable and accurate temperature reference.

The method may further include obtaining a second subset of IR pixels, representing the determined predefined feature in the IR image 530 by performing a VL-image to IR image coordinate transform. The VL-image to IR image coordinate transform may describe difference between the resolution of the VL and IR image, first field of view of the IR imaging system and the second field of view of the VL imaging system. The field of view may be determined using a known relationship/association between the imaging systems 11, 12, such as known parallax distance between the optical axis of the IR imaging system 12 and the VL imaging system 11, pointing error indicating an angle between the optical axes of the IR imaging system 12, relative difference in rotation around the optical axis of the IR imaging system 12 and the VL imaging system 11, the number of sensor elements (resolution) of the IR imaging system 12 and the VL imaging system 11 and/or the relationship between the FOV of the IR imaging system 12 and the VL imaging system 11. Said relationships or associations may have been determined during design of the thermography arrangement, production of the thermography arrangement or calibration of the thermography arrangement, as would be under stood by a person skilled in the art The transform may map a first set of captured VL pixel coordinates to a second set of captured infrared data values pixel coordinates. The transform may alternatively map a first set of captured VL pixel coordinates to an intermediate set of IR representation pixels. The second set a second set of captured infrared data values pixel coordinates is subsequently obtained from said intermediate set of IR representation pixels by an association between captured infrared data values and the IR representation pixels obtained from the transform, as would be understood by a skilled person.

The expected predetermined temperature value of an object, such as the human face, might depend on the distance to the object, which in turn might be compensated for. This compensation might comprise obtaining a compensation value based on said $SCENE_{dist}$, e.g. in the form of a look-up table as would be understood by a person skilled in the art. In a subsequent step calibration of said IR imaging system dependent on captured infrared data values comprised in said second subset of said IR pixels and a predetermined temperature value is performed.

Calibrating said IR imaging system might comprise to calibrate said IR imaging system dependent on the captured infrared data values of the second subset of said IR pixels and a predetermined temperature value, retrieved from memory, associated to said predefined feature. Calibrating said IR imaging system might further comprises estimating the distance $SCENE_{dist}$ from the thermography arrangement to the observer real world scene, where the distance is dependent on the size of the second subset of said IR pixels, in other words the number of IR pixels in the second subset.

This might involve adapting current IR calibration data parameters so that when they are applied to said second set of infrared data values, e.g. the pixels in the IR image representing a human face or part of a human face, the resulting temperature value substantially correspond to a predetermined temperature value, e.g. a statistical value of 35 degrees Celsius considered to represent a human face captured by a thermography arrangement.

Further Embodiments

As is readily apparent to a person skilled in the art, the captured and associated images may be further processed in a suitable manner, e.g., to obtain images that are fused, blended or presented as picture in picture.

According to an embodiment, the processor is configurable using a hardware description language (HDL). According to an embodiment, the processor 2 is a Field-programmable gate array (FPGA) or other type of logic device. According to an embodiment, the processor 2 is further adapted to perform all or part of the method embodiments described herein.

According to an embodiment of the invention, there is provided a computer system having a processor being adapted to perform all or part of the method embodiments described herein.

According to an embodiment of the invention, there is provided a computer-readable medium on which is stored non-transitory information adapted to control a processor to perform all or part of the method embodiments described herein.

According to an embodiment of the invention, there is provided a computer program product comprising code portions adapted to control a processor to perform all or part of the method embodiments described herein.

According to an embodiment of the invention, there is provided a computer program product comprising configuration data adapted to configure a Field-programmable gate array (FPGA) to perform all or part of the method embodiments described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Where applicable, the various hardware components and/or software components set forth herein can be combined into composite components comprising software, hardware, and/or both without departing from the spirit of the present disclosure. Also where applicable, the various hardware components and/or software components set forth herein can be separated into subcomponents comprising software, hardware, or both without departing from the spirit of the present disclosure. In addition, where applicable, it is contemplated that software components can be implemented as hardware components, and vice-versa.

While various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising: capturing an infrared (IR) image depicting an observed real world scene using an IR imaging system of a thermography arrangement, wherein the captured IR image comprises IR pixels, wherein the IR pixels comprise captured infrared data values of IR radiation emitted from the observed real world scene; determining that a predefined feature comprising a predetermined temperature value is present in the observed real world scene; obtaining a subset of the IR pixels representing the predefined feature in the IR image, wherein the subset of the IR pixels comprises fewer IR pixels than all of the IR pixels in the IR image; and calibrating the IR imaging system based on the captured infrared data values associated with the subset of the IR pixels and the predetermined temperature value associated with the predefined feature, wherein the calibrating the IR imaging system comprises: retrieving current IR calibration parameters, generating updated IR calibration parameters based on the captured infrared data values associated with the subset of the IR pixels, the current IR calibration data parameters, and the predetermined temperature value, and storing the updated IR calibration parameters as the current IR calibration parameters, the updated IR calibration parameters being generated by adapting the current IR calibration data parameters so that a difference between the predetermined temperature value and the captured infrared data values of the subset of said IR pixels with the current IR calibration parameters applied is minimized.

2. The method according to claim 1, further comprising capturing a visible light (VL) image depicting the observed real world scene using a VL imaging system of the thermography arrangement, wherein:
the captured VL image comprises VL pixels to provide a visual representation of the captured VL image;
the determining that the predefined feature is present comprises determining that the predefined feature is represented by a subset of the VL pixels in the VL image; and
obtaining the subset of the IR pixels comprises:
obtaining VL pixel coordinates of the subset of VL pixels representing the predefined feature in the VL image,
transforming the VL pixel coordinates into IR pixel coordinates in the IR image, and
obtaining the subset of the IR pixels based on the IR pixel coordinates.

3. The method according to claim 2, further comprising estimating the distance $SCENE_{dist}$ from the thermography arrangement to the observed real world scene.

4. The method according to claim 3, wherein the estimating the distance $SCENE_{dist}$ is based on the size of the subset of the VL pixels.

5. The method according to claim 3, wherein the predetermined temperature value is dependent on the estimated distance $SCENE_{dist}$ from the thermography arrangement to the observed real world scene.

6. The method according to claim 1, wherein the updated IR calibration parameters are dependent on a plurality of candidates for IR calibration parameters and corresponding weights.

7. The method according to claim 6, wherein the generating the updated IR calibration parameters comprises calculating a weighted sum of the plurality of candidates for IR calibration parameters and the corresponding weights.

8. The method according to claim 1, wherein the obtaining the subset of the IR pixels comprises:
obtaining IR pixels at multiple successive times; and
temporally filtering the IR pixels obtained at multiple successive times.

9. The method according to claim 1, wherein the predetermined temperature is determined based on a statistical probability of temperatures of the predefined feature.

10. A thermography arrangement comprising: an infrared (IR) imaging system configured to capture an IR image depicting an observed real world scene, wherein the IR image comprises IR pixels, wherein the IR pixels comprise captured infrared data values of IR radiation emitted from the observed real world scene; a processor communicatively coupled to the IR imaging system and configured to: determine that a predefined feature comprising a predetermined temperature value is present in the observed real world scene, obtain a subset of the IR pixels representing the predefined feature in the IR image, wherein the subset of the IR pixels comprises fewer IR pixels than all of the IR pixels in the IR image, calibrate the IR imaging system based on the captured infrared data values associated with the subset of the IR pixels and the predetermined temperature value associated with the predefined feature, retrieve current IR calibration parameters, generate updated IR calibration parameters based on the captured infrared data values associated with the subset of the IR pixels, the current IR calibration data parameters, and the predetermined temperature value, and store the updated IR calibration parameters as the current IR calibration parameters in the memory, the updated IR calibration parameters being generated by adapting the current IR calibration data parameters so that a difference between the predetermined temperature value and the captured infrared data values of the subset of said IR pixels with the current IR calibration parameters applied is minimized; and a memory communicatively coupled to the processor and configured to store the IR image.

11. The thermography arrangement of claim 10, further comprising a visible light (VL) imaging system configured to capture a VL image depicting the observed real world scene, wherein:
the captured VL image comprises VL pixels to provide a visual representation of the captured VL image; and
the processor is further configured to:
determine that the predefined feature is present by determining that the predefined feature is represented by a subset of the VL pixels in the VL image,
obtain VL pixel coordinates of the subset of VL pixels representing the predefined feature in the VL image,
transform the VL pixel coordinates into IR pixel coordinates in the IR image, and
obtain the subset of the IR pixels based on the IR pixel coordinates.

12. The thermography arrangement of claim 11, wherein the processor is further configured to estimate the distance $SCENE_{dist}$ from the thermography arrangement to the observed real world scene.

13. The thermography arrangement of claim 12, wherein the predetermined temperature value is dependent on the estimated distance $SCENE_{dist}$ from the thermography arrangement to the observed real world scene.

14. The thermography arrangement of claim 10, wherein:
the memory is configured to store a plurality of candidates for IR calibration parameters; and
the processor is further configured to generate the updated IR calibration parameters by calculating a weighted sum of the plurality of candidates for IR calibration parameters and corresponding weights.

15. The thermography arrangement of claim 10, wherein the processor is further configured to:
obtain IR pixels at multiple successive times; and
temporally filter the IR pixels obtained at multiple successive times.

16. The thermography arrangement of claim 10, wherein the memory is a volatile memory that is:
integrated in the thermography arrangement;
coupled to the thermography arrangement; or
integrated in an external unit configured to receive data from, and/or transfer data to, the thermography arrangement.

17. The thermography arrangement of claim 11, wherein the predetermined temperature is determined based on a statistical probability of temperatures of the predefined feature.

18. A non-transitory computer-readable medium on which is stored non-transitory information configured to control a processor to perform a method comprising: capturing an infrared (IR) image depicting an observed real world scene using an IR imaging system of a thermography arrangement, wherein the captured IR image comprises IR pixels, wherein the IR pixels comprise captured infrared data values of IR radiation emitted from the observed real world scene; determining that a predefined feature comprising a predetermined temperature value is present in the observed real world scene; obtaining a subset of the IR pixels representing the predefined feature in the IR image, wherein the subset of the IR pixels comprises fewer IR pixels than all of the IR pixels in the IR image; and calibrating the IR imaging system based on the captured infrared data values associated with the subset of the IR pixels and the predetermined temperature value associated with the predefined feature, wherein the calibrating the IR imaging system comprises: retrieving current IR calibration parameters, generating updated IR calibration parameters based on the captured infrared data values associated with the subset of the IR pixels, the current IR calibration data parameters, and the predetermined temperature value, and storing the updated IR calibrations parameters as the current IR calibration parameters, the updated IR calibration parameters being generated by adapting the current IR calibration data parameters so that a difference between the predetermined temperature value and the captured infrared data values of the subset of said IR pixels with the current IR calibration parameters applied is minimized.

* * * * *